UNITED STATES PATENT OFFICE.

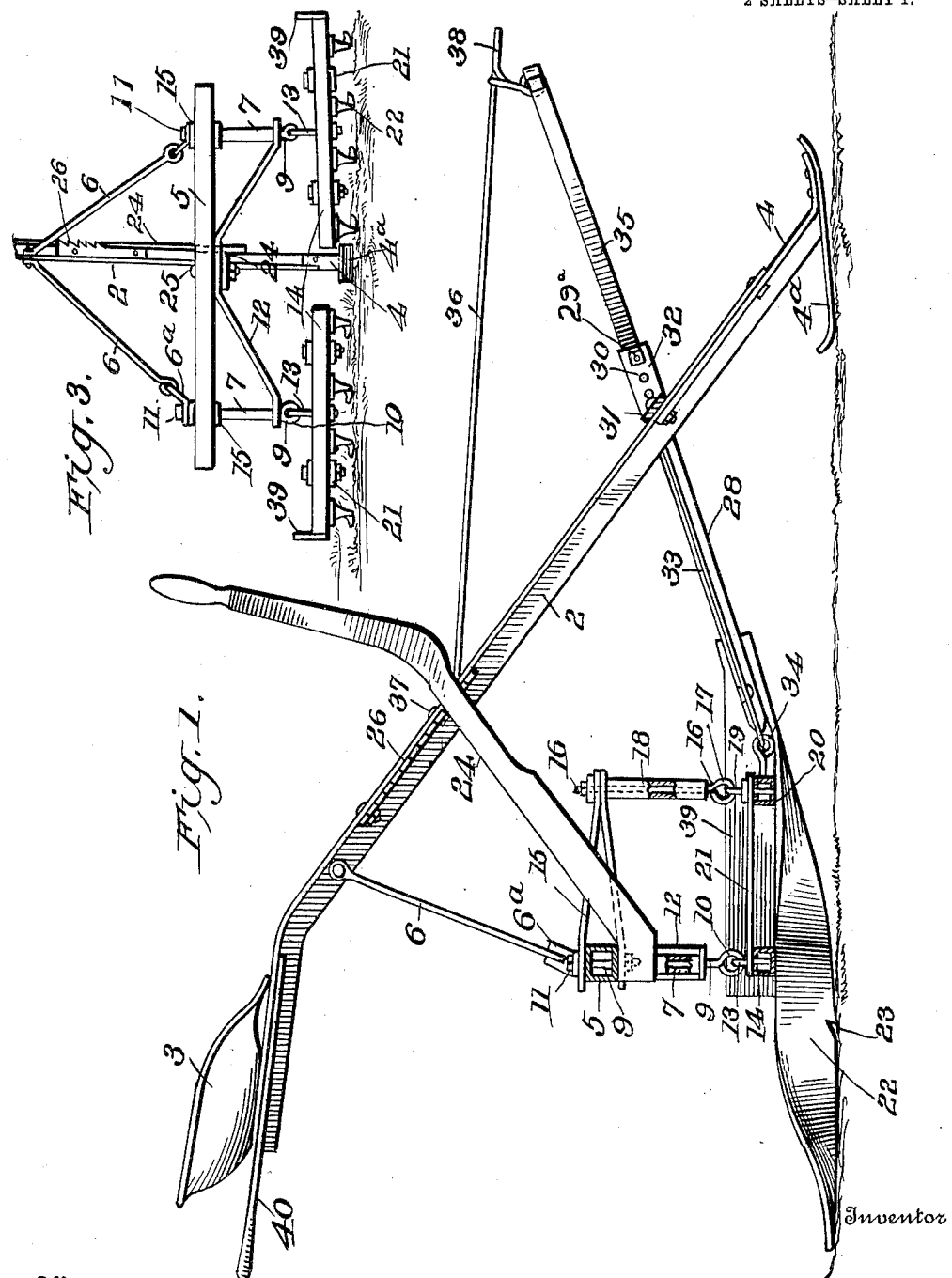

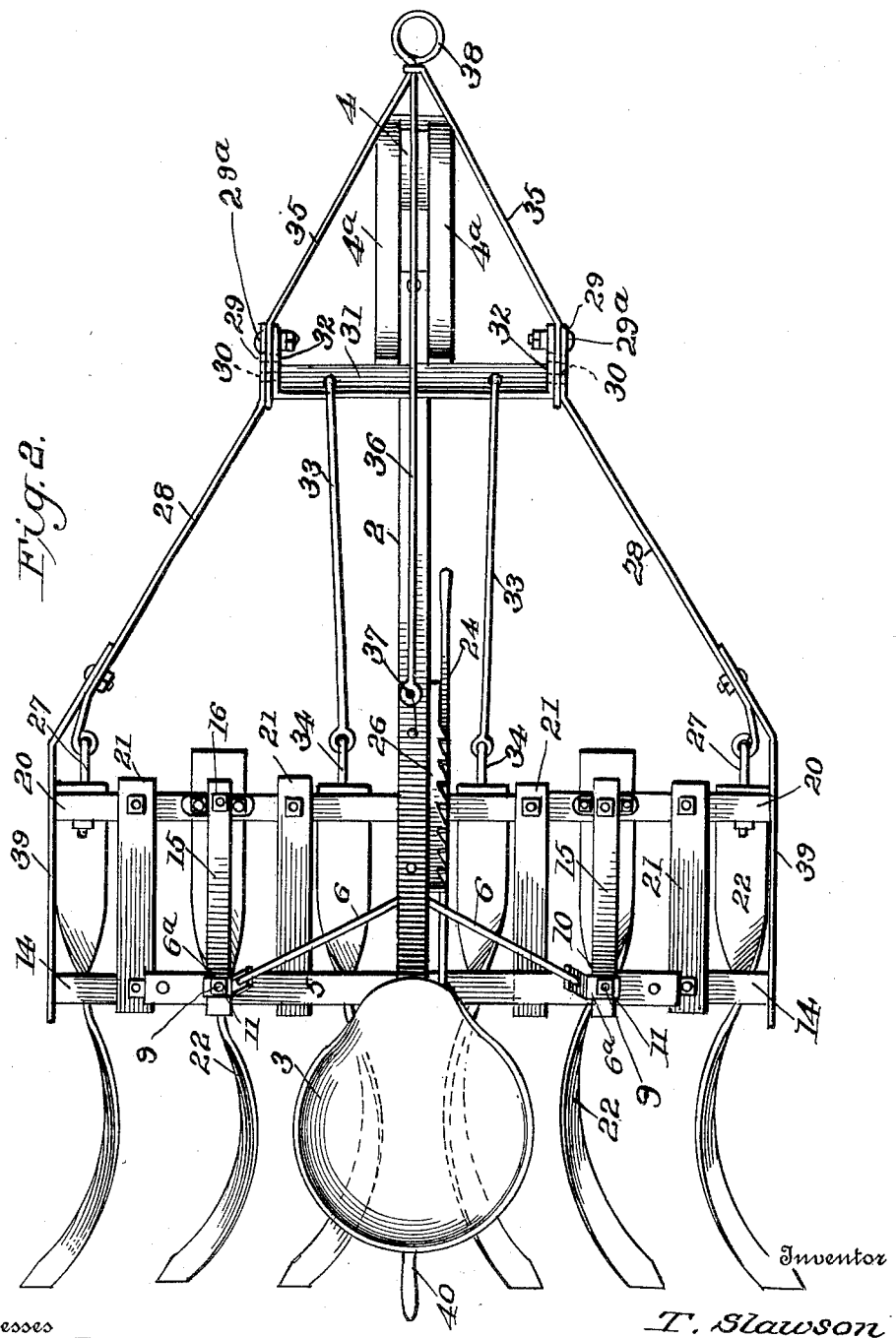

THOMAS SLAWSON, OF REA, MISSOURI.

SURFACE-PULVERIZER.

1,097,685. Specification of Letters Patent. Patented May 26, 1914.

Application filed August 6, 1912. Serial No. 713,630.

*To all whom it may concern:*

Be it known that I, THOMAS SLAWSON, citizen of the United States, residing at Rea, in the county of Andrew and State of Missouri, have invented certain new and useful Improvements in Surface-Pulverizers, of which the following is a specification.

My invention relates to cultivators and particularly to a soil pulverizing cultivator. This machine is designed to be used in cultivating corn, potatoes and other vegetables and crops, and particularly for use in dry weather. In a drought the moisture in the soil rises through capillary attraction to the surfaces of the soil and the sun dries the moisture out.

The primary object of my cultivator is to pulverize the surface soil and break it up into a fine dust, thus forming what may be termed a dust mulch. This dust mulch acts to conserve the moisture in the earth and prevents the moisture from rising to the surface and keeps the moisture in the earth. As a consequence when plants are cultivated by my cultivator, dry weather does not affect them.

A further object is to provide a cultivator of this character, so constructed that the plants being cultivated shall be protected from injury while the weeds, grasses, etc., between the rows shall be destroyed.

A further object is to provide means for adjustably widening the rear portions of the cultivator sections to suit the width of row being cultivated.

A further object is to provide a cultivator cheap to manufacture, readily adjustable as to the depth to be pulverized and light of draft.

Other objects will appear in the course of the following description.

My improved cultivator is illustrated in the accompanying drawings wherein:

Figure 1 is a longitudinal section of a cultivator constructed in accordance with my invention. Fig. 2 is a plan view thereof. Fig. 3 is a rear elevation of the cultivator.

Corresponding and like parts are referred to in the following description and indicated in all the views of the accompanying drawings by the same reference characters.

In these drawings, 2 designates a seat supporting beam which as shown is formed of T iron and extends upward and rearward from the front of the machine. A seat 3 is attached to the rear end while extending downward from the lower forward end is a plate 4 bifurcated to fit around the vertical flange of the iron and riveted thereto, and upwardly and forwardly turned at its forward end. To the plate or strip is attached a flat relatively wide runner 4$^a$ having its forward end slightly turned up and extending rearward of the strip 4 and having its rear end turned up.

Disposed below and in advance of the seat 3 is a transversely extending oscillatable gang supporting bar 5 shown as square in cross section to which beam 2 is pivotally connected by means of links 6, 6. These links are divergent and extend forward and upward from the main supporting bar 5. They are pivotally connected at their upper ends to the vertical flange of the angle iron 2 and at their lower ends are pivotally connected to clips 6$^a$ in turn connected to the transverse bar 5. Extending down from the supporting bar 5 adjacent the opposite ends thereof are supports 7 having the form of spacing sleeves. Passing through these sleeves are bolts 9 having eyes 10 at their lower ends and at their upper ends having nuts 11 engaging the clips 6$^a$. These bolts also pass through perforations on the ends of an approximately bowed brace 12 which at its middle contacts with and supports the bar 5. Depending from the eyes on the lower ends of bolts 9 are I-bolts 13 which pass each through the middle of transverse bar-like members 14 which I shall hereafter term the rear gang bars.

Attached to the supporting bar 5 by the bolts 9 are the brackets 15 comprising an upper and a lower flat rod converging at their forward ends. These brackets project forward and depending therefrom are the bolts 16 which are formed with eyes 17 at their lower ends. Surrounding the bolts are the spacing sleeves or tubular posts 18. Connected thereto at the middle by I-bolts 19 are the front gang bars 20 shown as two in number and corresponding to the rear gang bars. These are connected to the rear gang bars by links 21 bolted to said bars. Attached to the under sides of the front gang bars are the rearwardly extending blades 22. The front end of each blade is horizontally disposed and is twisted back of its point of attachment so as to be vertically disposed beneath the rear bar 14. Back of the corresponding rear gang bar each blade is bowed toward the middle of the machine and the under edge of each blade is notched at the middle part as at 23.

For the purpose of elevating or depressing the forward end of the blades 22 and thus regulating the depth of cultivation, I provide a lever 24. This lever is angular in form and at its lower end extends beneath and is attached to the supporting bar 5 by means of a bolt 25 passing through the middle of the brace 12. The lever extends upward and its upper end is approximately vertical and terminates in a handle. The hand lever operates against a rack 26 carried on the seat supporting beam 2. By drawing the upper end of this lever toward the seat 3, the transverse supporting bar 5 will be rotated axially, thus raising the brackets 15 and the forward ends of the blades and depressing the rear ends thereof, thus causing the blades to be forced deeper into the soil and increasing the depth of cultivation. It will be seen that the curvature of the blades acts to scrape the surface of the soil, pulverize the same and spread it more or less evenly.

Projecting from the outer ends of the forward gang bars 20 are the I-bolts 27 to which are attached the forward converging draft bars 28. Each at its forward end is bent to provide a terminal portion 29 extending parallel to the line of draft and formed with a plurality of perforations 30. Extending between these terminal ends 29 is a transverse bar 31 rigidly secured at its middle to the supporting beam 2. This transverse bar 31 is angularly bent at its ends as at 32. Pivotally connecting the bar 31 with the inner ends of the forward gang bars 20 are the links 33, the links being formed with eyes at their rear ends engaging with I-bolts 34. Pivotally connected to the angular ends of bar 31 are the upwardly extending converging draft bars 35 bolted at their meeting ends to a clip engaging with a draft rod or brace 36 which extends back and is bolted to the supporting beam 2 at 37. This brace at its forward end is provided with a clevis 38 by which draft animals may be attached to the cultivator. Bolts 29ª pass through the forward ends of the angular terminal ends 32 of the transverse bar 31, through the rear ends of the draft bars 35 and through the portions 29 of draft bars 28, thereby pivotally connecting the rear draft bars to the forward bars. The rod 36 holds the forward draft bars 35 from movement on the pivot bolts.

In order to prevent plants being cultivated from being destroyed by the cultivator, I provide plant fenders 39 each attached at its rear end to the outer end of the corresponding gang bar 14 extending forward parallel to the line of draft and past the ends of the forward gang bar 20 and then angularly bent and bolted to the rear ends of draft bar 28.

The operation of my improved cultivator is as follows. When drawn over the field between the rows, the blades 22 pulverize the surface soil so as to reduce it to a fine or dust-like condition or dust mulch. If it is desired to increase the depth of soil pulverized, the hand lever 24 is drawn rearward which depresses the rear portions of the blades and the rear ends of the draft links 28 move upward. If it is desired to widen the area acted upon by the blades, the links 28 are shifted forward with relation to the cross bar 31 and the bolts 29ª placed in the rear holes therein, thus swinging the outer ends of the blade carrier gang bars 14 and 20 forward and their inner ends outward.

I have found by actual experience that a cultivator constructed in accordance with my invention is very light, easily operated and is entirely effective in use. I have used this cultivator in periods of drought when crops in the neighborhood were dying for want of water and have succeeded in securing extremely good results where on land not worked by my cultivator the crops were a failure. The upper end of the seat supporting beam 2 is provided with a handle 40 for the hand of the operator to grasp.

Attention should here be called to the peculiar form of the blades. It will be noted that the blades are twisted, that the front portion of the blade is nearly horizontal, that it then turns to a vertical position and then is again twisted so that the rear portion of the blade is inclined and at the same time extends out laterally beyond the forward portion of the blade. Where these blades first touch the ground at the front end of the blades, they are flat and operate as clod crushers. Each blade then makes a half turn and is curved so as to scrape the top of the ground and to cut weeds. Then the blades make a quarter of a turn and curve laterally so as to turn the ground or draw up from the rear end of the blades. The rear end of the blades runs slightly into the ground.

The width of the surface pulverizer is adjusted as follows: The ends of the braces 28 have three holes each along the flat portion 29 and these braces may be adjusted relatively to the cross bar 31 by shifting the connecting bolts into any one of these holes. If the braces are advanced relative to the bar 31, it increases the width of the carrying members and the blades 22 as a consequence cover more ground. This separation of the frames carrying the blades is permitted by the fact that the bar 5 has two pair of holes for the bolts 9 and thus the frames which hold the blades can be shifted. The braces 12 have also two holes at their lower ends and the bolts 9 may be shifted in these holes to correspond with the shifting of the bolts in the bar 5. The bolts connecting the forward draft members 35 to the members 28 have the taps fastened on so loosely that the machine at this point is loose jointed.

It is to be noted that the gang bars which hold the blades will move in any direction to fit the contour of the surface. The entire frame will rise or fall upon an axis extending through the bolts connecting the members 35 to the members 28 and the front part of each knife supporting frame will also rise and fall independently of the rear. Furthermore, these knife supporting gang bars because of the loose connections which they have to the supporting bar will readily turn and twist to conform to the contour of the ground.

It is to be particularly noted that the gang bars 14 and 20 are connected to the supporting bar 5 and to the brackets 15 by means of bolts, and that by loosening the nuts on the bolts, the bolts may be made freely rotatable, or that the bolts are rotatably adjusted so that the gang bars may be turned in a position of inclination relative to the seat supporting bar instead of a position at right angles thereto.

What I claim is:

1. A surface pulverizer including a supporting beam, front and rear transversely extending blade engaging gang bars pivotally mounted on said beam for movement in a horizontal plane, rearwardly extending blades engaged by said gang bars, and means whereby the gang bars may be rotated in a vertical plane to depress the rear ends of the blades.

2. A surface pulverizer including an upwardly and rearwardly extending seat supporting beam and a seat at its upper end, a transverse supporting bar disposed below the rear end of the seat supporting frame and connected thereto by links, brackets extending forward from the transverse bar, vertically disposed rotatable bolts depending from the transversely supporting bar and from the ends of the brackets, gang bars loosely connected each at its middle to the forward and rearward bolts, and rearwardly extending blades disposed beneath the under faces of said gang bars.

3. A cultivator of the character described, including a transversely extending main supporting bar, a rear gang bar operatively connected at its middle to the transverse bar for pivotal movement in a horizontal and a vertical plane, a bracket projecting from the main supporting bar at its middle, a front transversely extending gang bar operatively connected at its middle to the bracket for pivotal movement in vertical and horizontal planes, links pivotally connecting the front and rear gang bars, and blades mounted upon the front gang bar.

4. A cultivator of the character described, including an upwardly and rearwardly extending seat supporting beam, a transversely extending main supporting bar, links connecting said bar to the beam, rear gang bars, each operatively connected at its middle to the supporting bar for pivotal movement in a horizontal and a vertical plane, brackets projecting from the main supporting bar, front transversely extending gang bars operatively connected each at its middle to one of the brackets for pivotal movement in vertical and horizontal planes, bolts pivotally connecting the front and rear gang bars to the supporting bar, and blades mounted upon the front gang bar and extending rearward beneath the rear gang bar.

5. A cultivator of the character described, and including an upwardly and rearwardly extending seat supporting beam, a transversely extending main supporting bar, links connecting the beam with the bar, forwardly projecting brackets on the bar, front and rear transversely extending gang bars, bolts extending downwardly from the main supporting bar and from the ends of the brackets and loosely engaging the front and rear gang bars each at its middle, sleeves surrounding said bolts, links pivotally connecting the front and rear gang bars, a lever connected to the supporting bar and extending upward adjacent to the seat supporting beam and a rack on the beam with which the lever is engageable.

In testimony whereof I affix my signature in presence of two witnesses.

THOMAS SLAWSON. [L. S.]

Witnesses:
GEORGE E. JACKSON,
RALPH W. GILES.

---

Copies of this patent may be obtained for five cents each, by addressing the "Commissioner of Patents, Washington, D. C."